(12) United States Patent
Griffith (10) Patent No.: US 9,120,496 B1
(45) Date of Patent: Sep. 1, 2015

(54) GROCERY CART BEVERAGE HOLDER

(71) Applicant: Adam T. Griffith, Port Orange, FL (US)

(72) Inventor: Adam T. Griffith, Port Orange, FL (US)

( * ) Notice: Subject to any disclaimer, the term of this patent is extended or adjusted under 35 U.S.C. 154(b) by 0 days.

(21) Appl. No.: 14/182,406

(22) Filed: Feb. 18, 2014

(51) Int. Cl.
*B62B 5/00* (2006.01)
*B62B 3/14* (2006.01)

(52) U.S. Cl.
CPC .................. *B62B 5/00* (2013.01); *B62B 3/1444* (2013.01); *B62B 3/1468* (2013.01); *B62B 2202/023* (2013.01)

(58) Field of Classification Search
CPC .. B62B 5/00; B62B 3/1468; B62B 2202/023; B62B 3/1444
See application file for complete search history.

(56) References Cited

U.S. PATENT DOCUMENTS

| | | | |
|---|---|---|---|
| 4,826,058 A * | 5/1989 | Nakayama | 224/554 |
| 5,362,077 A | 11/1994 | Adamson | |
| D365,250 S | 12/1995 | Bergin | |
| 5,494,306 A * | 2/1996 | Adamson et al. | 280/33.992 |
| 6,186,382 B1 | 2/2001 | Bergin | |
| 6,644,524 B1 * | 11/2003 | Garvin | 224/411 |
| 6,749,204 B2 | 6/2004 | Werner | |
| 6,832,768 B2 * | 12/2004 | Duchene et al. | 280/33.993 |
| D536,502 S | 2/2007 | Weigand | |
| 7,384,049 B2 | 6/2008 | Peota | |
| 8,602,373 B2 * | 12/2013 | Beckey et al. | 248/311.2 |
| 2003/0132590 A1 * | 7/2003 | Werner | 280/33.992 |
| 2004/0090024 A1 * | 5/2004 | Duchene et al. | 280/33.993 |
| 2005/0199667 A1 | 9/2005 | Cappellino | |
| 2007/0007416 A1 | 1/2007 | Vogel | |
| 2007/0085283 A1 * | 4/2007 | Ryan | 280/33.992 |
| 2008/0237284 A1 | 10/2008 | Peota | |
| 2009/0140505 A1 * | 6/2009 | Fryer et al. | 280/33.994 |
| 2009/0236381 A1 * | 9/2009 | Buehler | 224/411 |
| 2011/0181007 A1 * | 7/2011 | Caruso et al. | 280/33.992 |

* cited by examiner

*Primary Examiner* — Brian D Nash
(74) *Attorney, Agent, or Firm* — Kyle A. Fletcher, Esq.

(57) ABSTRACT

The grocery cart beverage holder is configured for use in attaching itself in between the rear wall of a grocery cart and a pivoting child seat wall in order to support a beverage upright there between. The grocery cart beverage holder is constructed of a first member hingedly connected to a second member. The first member and the second member each have a beverage cutout that align with one another to collectively for a cup holder slot. The first member as well as the second member include a slideable member that extends distally away from the respective member. The slideable members each include a clip configured for use in securing the slideable member onto the surface of the grocery cart.

16 Claims, 6 Drawing Sheets

GROCERY CART BEVERAGE HOLDER

CROSS REFERENCES TO RELATED APPLICATIONS

Not Applicable.

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of grocery carts, more specifically, a beverage holder that is configured to support itself and a cup with respect to a grocery cart.

B. Discussion of the Prior Art

As will be discussed immediately below, no prior art discloses a grocery cart beverage holder that is configured for use in attaching itself in between the rear wall of a grocery cart and a pivoting child seat wall in order to support a beverage upright there between; wherein the grocery cart beverage holder is constructed of a first member hingedly connected to a second member; wherein the first member and the second member each have a beverage cutout that align with one another to collectively for a cup holder slot; wherein the first member as well as the second member include a slideable member the slideable members each include a clip configured for use in securing the slideable member onto the surface of the grocery cart; wherein a wire hanger extends and connects the first member to the second member in order to enable rotation of the first member with respect to the second member; wherein the wire hanger rotates downwardly beneath the cup holder slot to limit the travel of the beverage into the cup holder slot; wherein either the first member or the second member may include a coupon spring clip that is configured to secure at least one coupon thereto.

The Peota et al. Patent Application Publication (U.S. Pub. No. 2008/0237284) discloses a cup holder for a shopping cart. However, the cup holder is not a device that folds out to span in between the rear and pivoting child seat wall of the grocery cart.

The Vogel Patent Application Publication (U.S. Pub. No. 2007/0007416) discloses a folding beverage cup holder that can hang from the handle of a shopping cart. However, the cup holder is not able to span in between the rear and pivoting child seat walls of a grocery cart.

The Cappellino et al. Patent Application Publication (U.S. Pub. No. 2005/0199667) discloses a cup holder mountable on a shopping cart. Among other things, the cup holder is not able to span in between the rear and pivoting child seat walls of a grocery cart.

The Werner Patent (U.S. Pat. No. 6,749,204) discloses a cup holder attached to, or incorporated into, a portion of an open top basket of a standard wire mesh shopping cart. However, the cup holder is not able to span in between the rear and pivoting child seat walls of a grocery cart.

The Bergin et al. Patent (U.S. Pat. No. 6,186,382) discloses a cup holder mountable on the interior of a supermarket cart. Among other things, the cup holder is not able to span in between the rear and pivoting child seat walls of a grocery cart.

The Adamson Patent (U.S. Pat. No. 5,362,077) discloses a shopping cart having a retractable cup holder. However, the cup holder is not adapted for use in between the rear wall and pivoting child seat wall of a grocery cart.

The Peota et al. Patent (U.S. Pat. No. 7,384,049) discloses a cup holder for a shopping cart. However, the cup holder is not adapted to be positioned in between the pivoting child seat wall and rear wall of a grocery cart in order to support itself and suspend a beverage there between.

The Ryan Patent (U.S. Pat. No. 7,219,901) discloses a cup holder for mounting on a basket of a shopping cart. However, the cup holder only clips onto a single surface.

While the above-described devices fulfill their respective and particular objects and requirements, they do not describe a grocery cart beverage holder that is configured for use in attaching itself in between the rear wall of a grocery cart and a pivoting child seat wall in order to support a beverage upright there between; wherein the grocery cart beverage holder is constructed of a first member hingedly connected to a second member; wherein the first member and the second member each have a beverage cutout that align with one another to collectively for a cup holder slot; wherein the first member as well as the second member include a slideable member that extends distally away from the respective member; wherein the slideable members each include a clip configured for use in securing the slideable member onto the surface of the grocery cart; wherein a wire hanger extends and connects the first member to the second member in order to enable rotation of the first member with respect to the second member; wherein the wire hanger rotates downwardly beneath the cup holder slot to limit the travel of the beverage into the cup holder slot; wherein either the first member or the second member may include a coupon spring clip that is configured to secure at least one coupon thereto. In this regard, the grocery cart beverage holder departs from the conventional concepts and designs of the prior art.

SUMMARY OF THE INVENTION

The grocery cart beverage holder is configured for use in attaching itself in between the rear wall of a grocery cart and a pivoting child seat wall in order to support a beverage upright there between. The grocery cart beverage holder is constructed of a first member hingedly connected to a second member. The first member and the second member each have a beverage cutout that align with one another to collectively for a cup holder slot. The first member as well as the second member include a slideable member that extends distally away from the respective member. The slideable members each include a clip configured for use in securing the slideable member onto the surface of the grocery cart. The wire hanger extends and connects the first member to the second member in order to enable rotation of the first member with respect to the second member. The wire hanger rotates downwardly beneath the cup holder slot to limit the travel of the beverage into the cup holder slot. Either the first member or the second member may include a coupon spring clip that is configured to secure at least one coupon thereto.

It is an object of the invention to provide a device that clips onto the rear wall of a grocery cart and the pivoting child seat wall in order to erect a beverage holder there between.

A further object of the invention is to provide a device that is able to collapse in between uses.

A further object of the invention is to provide a device that includes a beverage cup slot and a wire hanger to limit the depth into which the beverage can be inserted.

These together with additional objects, features and advantages of the grocery cart beverage holder will be readily apparent to those of ordinary skill in the art upon reading the following detailed description of presently preferred, but nonetheless illustrative, embodiments of the grocery cart beverage holder when taken in conjunction with the accompanying drawings.

In this respect, before explaining the current embodiments of the grocery cart beverage holder in detail, it is to be understood that the grocery cart beverage holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the grocery cart beverage holder.

It is therefore important that the claims be regarded as including such equivalent construction insofar as they do not depart from the spirit and scope of the grocery cart beverage holder. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5A. A grocery cart beverage holder 100 (hereinafter invention) is further defined with a first member 101 and a second member 111. The first member 101 and the second member 111 each have a beverage cutout 121 that when aligned forms a cup holder slot 122. The first member 101 is further defined with a first inner edge 102 and a first outer edge 103 whereas the second member 111 includes a second inner edge 112 and a second outer edge 113. The first inner edge 102 abuts the second inner edge 112 when the first member 101 and the second member 111 are forming a planar surface or are generally parallel with one another. Moreover, the first member 101 has a shape that mirrors that of the second member 111.

The first outer edge 103 and the second outer edge 113 define a length 105 of the first member 101 and the second member 111 collectively. The first outer edge 103 and the second outer edge 113 each include a slideable member 131, which extends laterally to adjust to an opening provided on a grocery cart 200. Moreover, the slideable members 131 each include a first slideable member 132 and a second slideable member 133. The second slideable member 133 includes a clip member 134 that enables the slideable member 131 to attach itself to the grocery cart 200. It shall be noted that the grocery cart 200 is further defined with a rear wall surface 201 and a pivoting child seat wall surface 202. The area in between the rear wall surface 201 and the pivoting child seat wall surface 202 is where the invention 100 is placed, and is configured for use there with as well as to support a beverage 300 therein.

The clip member 134 clips the slideable members 131 to the rear wall surface 201 and the pivoting child seat wall surface 202. Moreover, the clip members 134 attach to a top child edge 203 of the pivoting child seat wall surface 202 as well as to a top rear edge 204 of the rear wall surface 201.

Figure 3:
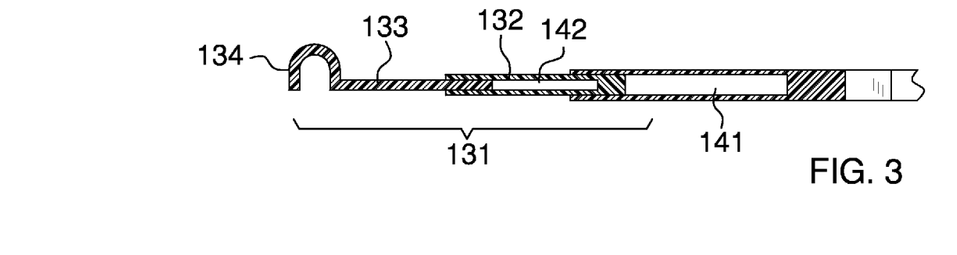
FIG. 3 illustrates a cross-sectional view along line 3-3 in FIG. 2 of the grocery cart beverage holder.
Figure 4:
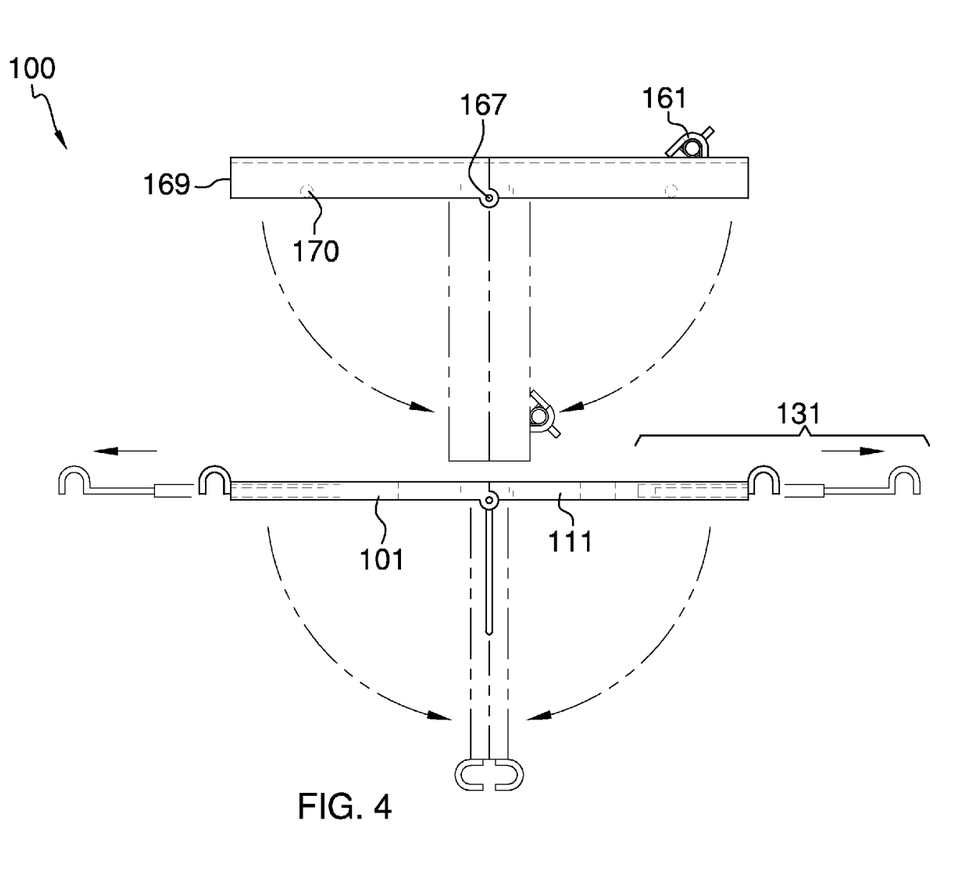
FIG. 4 illustrates a side view of the grocery cart beverage holder.

Referring to FIG. 3, the first slideable member 132 slides back and forth with respect to a recess 141 integrated into the first outer edge 103 and the second outer edge 113 of the first member 101 and the second member 111, respectively. The second slideable member 133 slides back and forth with respect to a second recess 142 integrated into the first slideable member 132. The second slideable member 133 and the clip member 134 are the same component, but identified relative to their respective function.

Figure 1:
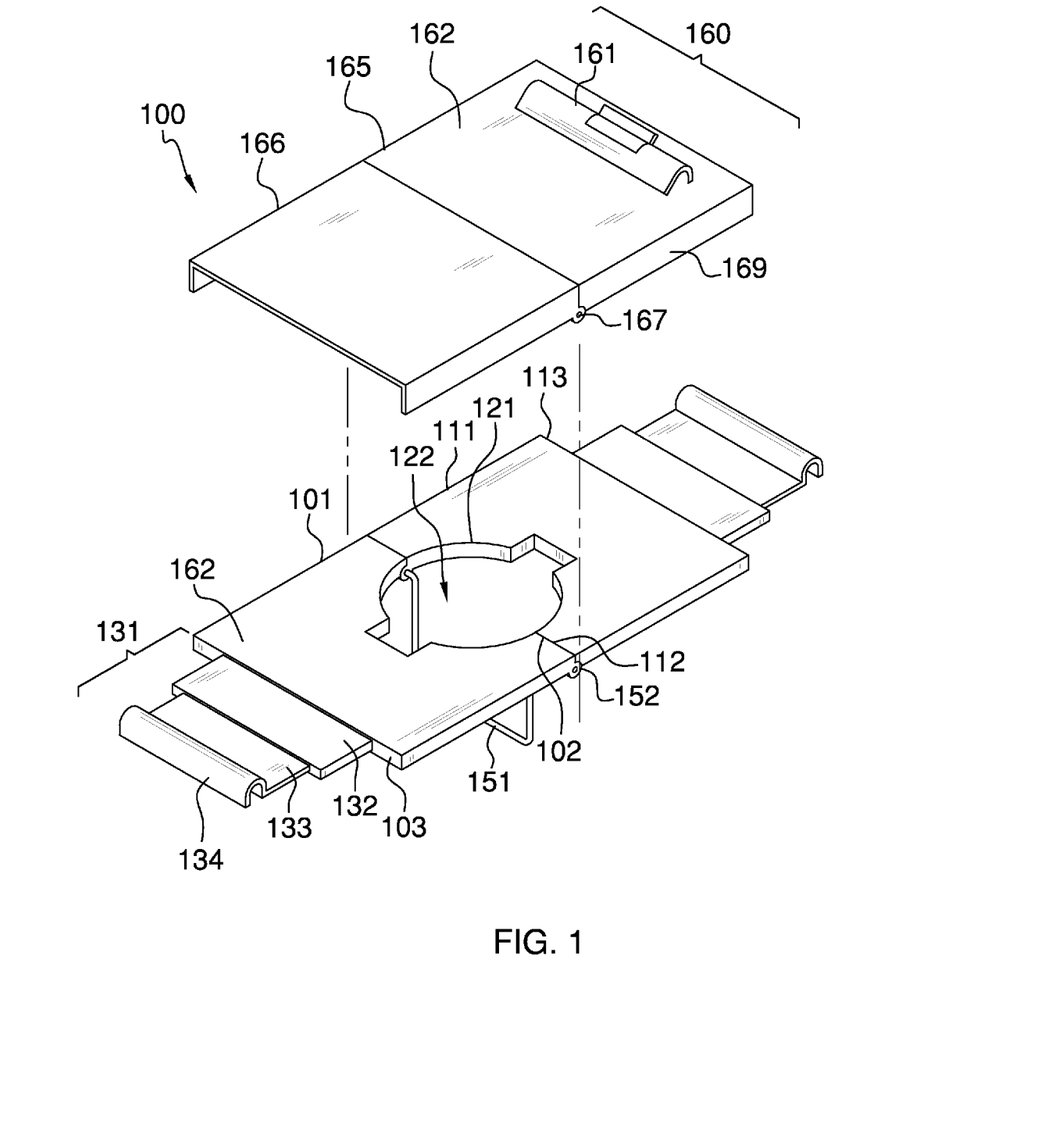
FIG. 1 illustrates a perspective view of the grocery cart beverage holder.
Figure 2:
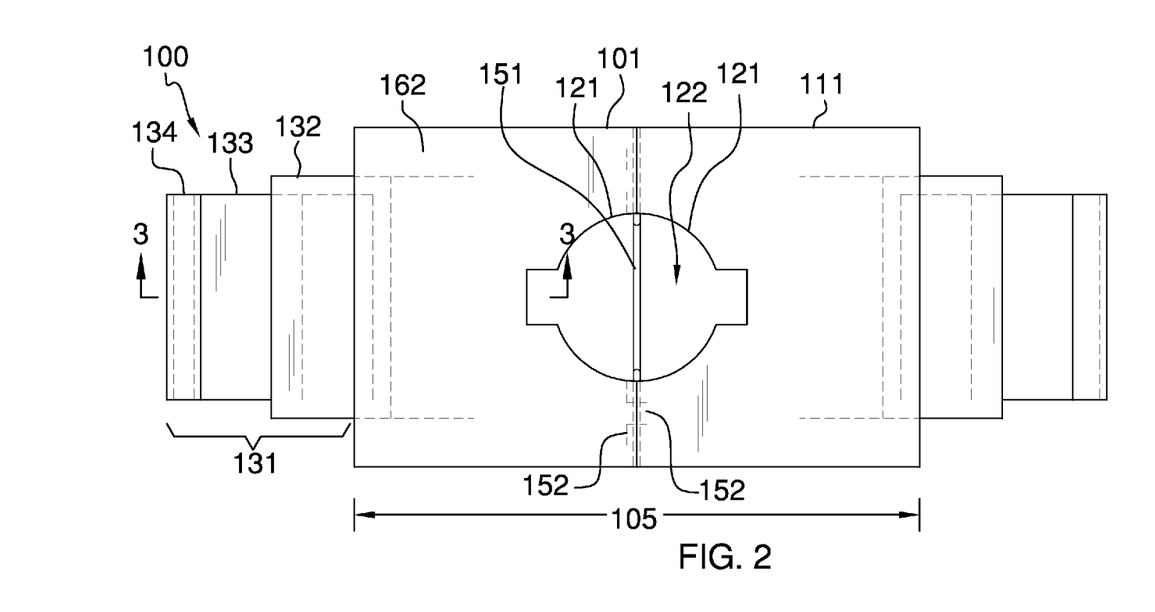
FIG. 2 illustrates a top view of the grocery cart beverage holder.

The invention 100 includes a wire hanger 151 that enables the first member 101 to pivot with respect to the second member 111. Moreover, the wire hanger 151 forms a hinge at where the first inner edge 102 abuts the second inner edge 112. Referring to FIG. 2, the wire hanger 151 enables interconnection of hinge arms 152 provided on both the first member 101 and the second member 111. Moreover, the hinge arms 152 are provided on opposing sides of the beverage cup slot 122. The wire hanger 151 connects the first member 101 to the second member 111, and also rotates downwardly to act as a stop to prevent the beverage 300 from traveling too far into the beverage cup slot 122.

Figure 2A:
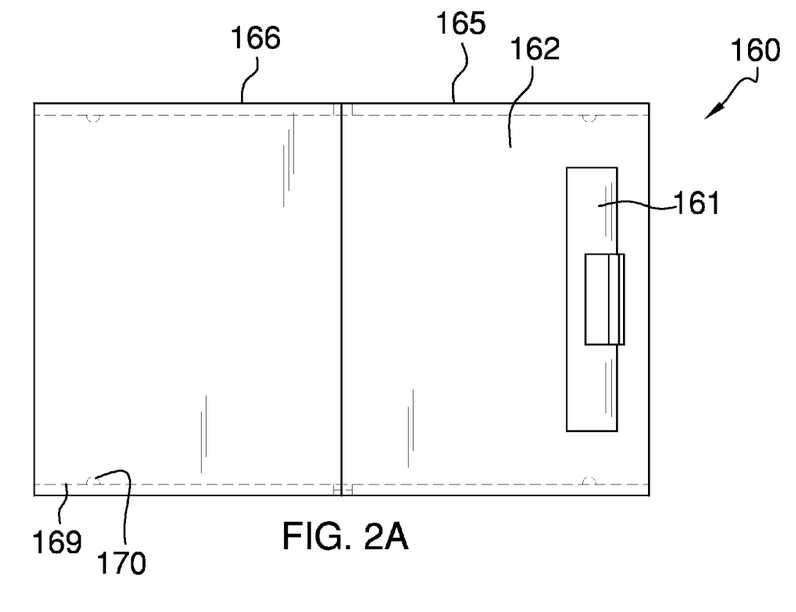
FIG. 2A illustrates a top view of the coupon holder by itself.

The invention 100 includes a coupon holder 160 that is fully detachable with respect to the first member 101 and the second member 111. Moreover, the coupon holder 160 is further defined with a coupon spring clip 161 on a top coupon surface 162. The coupon holder 160 is further defined with a first coupon member 165 and a second coupon member 166. The first coupon member 165 attaches to and pivots with respect to the second coupon member 166 via a coupon hinge 167. The first coupon member 165 and the second coupon member 166 both have an inverted "U" shape such that coupon side members 169 extend downwardly from opposing sides.

Figure 5:
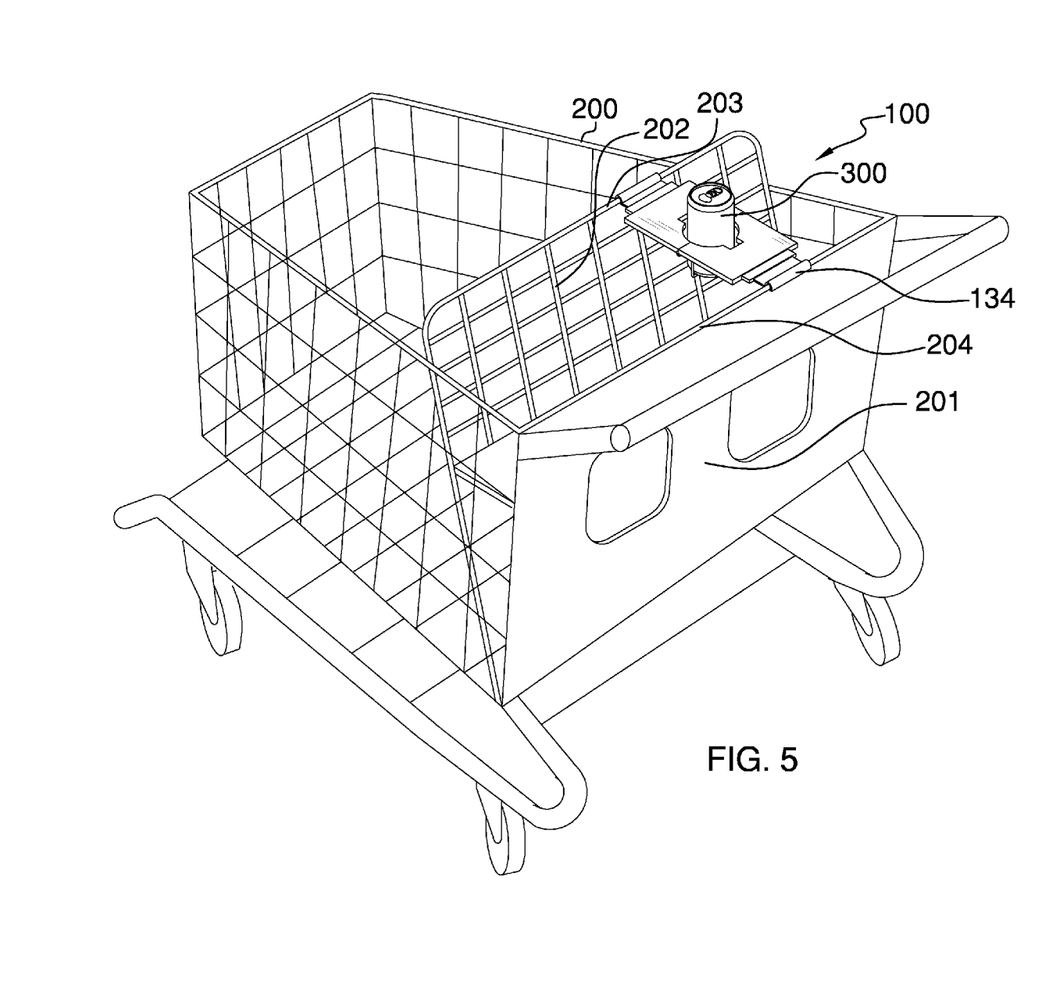
FIG. 5 illustrates a perspective view of the grocery cart beverage holder in use with a beverage.
Figure 5A:
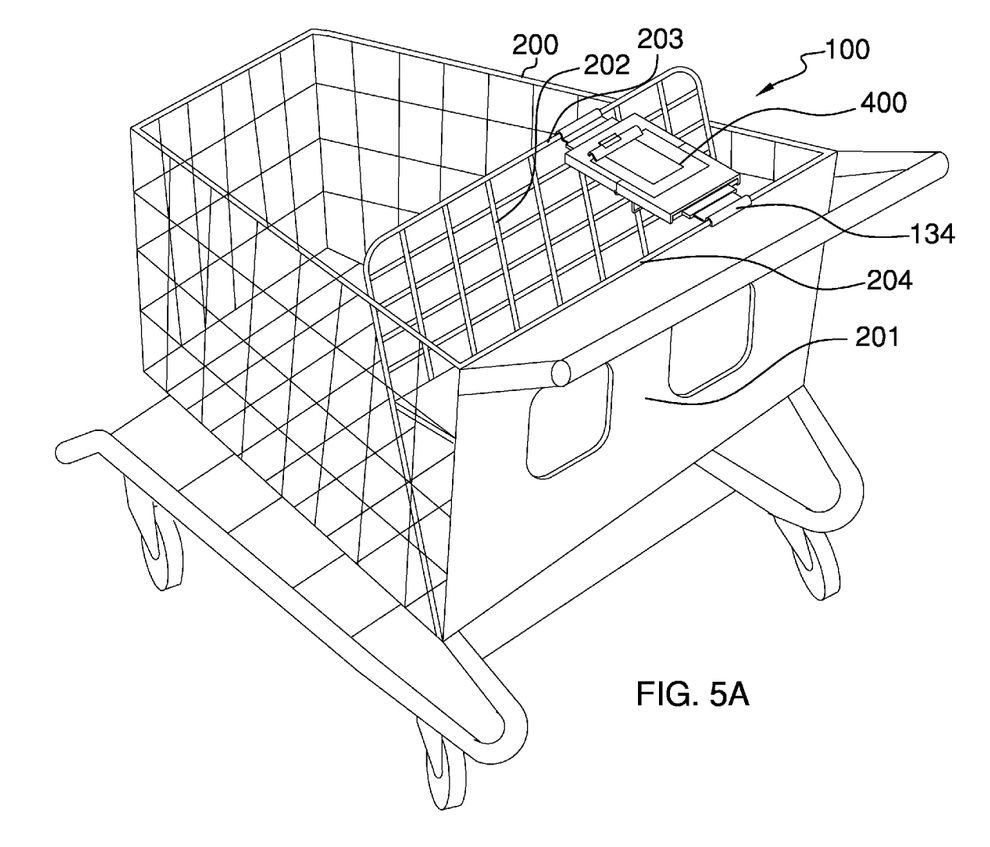
FIG. 5A illustrates a perspective view of the grocery cart beverage holder in use with the coupon holder holding a coupon.

The coupon side members 169 enable the coupon holder 160 to be seated on top of the first member 101 and the second member 111. Moreover, the coupon side members 169 include nodules 170 that are oriented inwardly in order to engage the sides of the first member 101 and the second member 111. The coupon holder 160 is able to support at least one coupon 400 on the top coupon surface 162 via the coupon spring clip 161.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A grocery cart beverage holder comprising:
a first member and a second member that are configured to clip themselves onto a rear wall and a pivoting child seat wall surface of a grocery cart;
wherein the first member and the second member collectively form a cup holder slot configured to support a beverage;
wherein the first member and the second member each have a beverage cutout that when aligned forms the cup holder slot; wherein the first member is further defined with a first inner edge and a first outer edge whereas the second member includes a second inner edge and a second outer edge;
wherein the first inner edge abuts the second inner edge when the first member and the second member are forming a planar surface, and are generally parallel with one another; wherein the first member has a shape that mirrors that of the second member; wherein the first outer edge and the second outer edge define a length of the first member and the second member collectively;
wherein the first outer edge and the second outer edge each include a slideable member, which extends laterally to adjust to an opening provided on the grocery cart.

2. The grocery cart beverage holder as claimed in claim 1 wherein the slideable members each include a first slideable member and a second slideable member; wherein the second slideable member includes a clip member that enables the slideable member to attach itself to the rear wall and the pivoting child seat wall surface of the grocery cart.

3. The grocery cart beverage holder as described in claim 2 wherein the clip member clips the slideable members to the rear wall surface and the pivoting child seat wall surface; wherein the clip members attach to a top child edge of the pivoting child seat wall surface as well as to a top rear edge of the rear wall surface.

4. The grocery cart beverage holder as described in claim 3 wherein the first slideable member slides back and forth with respect to a recess integrated into the first outer edge and the second outer edge of the first member and the second member, respectively.

5. The grocery cart beverage holder as described in claim 4 wherein the second slideable member slides back and forth with respect to a second recess integrated into the first slideable member.

6. The grocery cart beverage holder as described in claim 5 wherein a wire hanger enables the first member to pivot with respect to the second member; wherein the wire hanger forms a hinge at where the first inner edge abuts the second inner edge; wherein the wire hanger enables inter-connection of hinge arms provided on both the first member and the second member; wherein the hinge arms are provided on opposing sides of the beverage cup slot.

7. The grocery cart beverage holder as described in claim 6 wherein the wire hanger connects the first member to the second member, and also rotates downwardly to act as a stop to prevent the beverage from over travel with respect to the beverage cup slot.

8. The grocery cart beverage holder as described in claim 7 wherein a coupon holder is included, and is fully detachable with respect to the first member and the second member; wherein the coupon holder is further defined with a coupon spring clip on a top coupon surface; wherein the coupon holder is further defined with a first coupon member and a second coupon member; wherein the first coupon member attaches to and pivots with respect to the second coupon member via a coupon hinge; wherein the first coupon member and the second coupon member both have an inverted "U" shape such that coupon side members extend downwardly from opposing sides.

9. The grocery cart beverage holder as described in claim 8 wherein the coupon side members enable the coupon holder to be seated on top of the first member and the second member; wherein the coupon side members include nodules that are oriented inwardly in order to engage the sides of the first member and the second member; wherein the coupon holder is adapted to support at least one coupon on the top coupon surface via the coupon spring clip.

10. A grocery cart beverage holder comprising:
a first member and a second member that are configured to clip themselves onto a rear wall and a pivoting child seat wall surface of a grocery cart;
wherein the first member and the second member collectively form a cup holder slot configured to support a beverage;
wherein the first member and the second member each have a beverage cutout that when aligned forms the cup holder slot; wherein the first member is further defined with a first inner edge and a first outer edge whereas the second member includes a second inner edge and a second outer edge;
wherein the first inner edge abuts the second inner edge when the first member and the second member are forming a planar surface, and are generally parallel with one another; wherein the first member has a shape that mirrors that of the second member; wherein the first outer edge and the second outer edge define a length of the first member and the second member collectively;
wherein the first outer edge and the second outer edge each include a slideable member, which extends laterally to adjust to an opening provided on the grocery cart; wherein the slideable members each include a first slideable member and a second slideable member; wherein the second slideable member includes a clip member that enables the slideable member to attach itself to the rear wall and the pivoting child seat wall surface of the grocery cart.

11. The grocery cart beverage holder as described in claim 10 wherein the clip member clips the slideable members to the rear wall surface and the pivoting child seat wall surface; wherein the clip members attach to a top child edge of the pivoting child seat wall surface as well as to a top rear edge of the rear wall surface.

12. The grocery cart beverage holder as described in claim 11 wherein the first slideable member slides back and forth with respect to a recess integrated into the first outer edge and the second outer edge of the first member and the second member, respectively.

13. The grocery cart beverage holder as described in claim 12 wherein the second slideable member slides back and forth with respect to a second recess integrated into the first slideable member.

14. The grocery cart beverage holder as described in claim 13 wherein a wire hanger enables the first member to pivot with respect to the second member; wherein the wire hanger forms a hinge at where the first inner edge abuts the second inner edge; wherein the wire hanger enables inter-connection of hinge arms provided on both the first member and the second member; wherein the hinge arms are provided on opposing sides of the beverage cup slot; wherein the wire hanger connects the first member to the second member, and also rotates downwardly to act as a stop to prevent the beverage from over travel with respect to the beverage cup slot.

15. The grocery cart beverage holder as described in claim 14 wherein a coupon holder is included, and is fully detachable with respect to the first member and the second member; wherein the coupon holder is further defined with a coupon spring clip on a top coupon surface; wherein the coupon holder is further defined with a first coupon member and a second coupon member; wherein the first coupon member attaches to and pivots with respect to the second coupon member via a coupon hinge; wherein the first coupon member and the second coupon member both have an inverted "U" shape such that coupon side members extend downwardly from opposing sides.

16. The grocery cart beverage holder as described in claim 15 wherein the coupon side members enable the coupon holder to be seated on top of the first member and the second member; wherein the coupon side members include nodules that are oriented inwardly in order to engage the sides of the first member and the second member; wherein the coupon holder is adapted to support at least one coupon on the top coupon surface via the coupon spring clip.

* * * * *